(12) United States Patent
Simon et al.

(10) Patent No.: US 7,118,802 B2
(45) Date of Patent: Oct. 10, 2006

(54) MULTI-LAYER CERAMIC COMPOSITE MATERIAL WITH A THERMAL-PROTECTIVE EFFECT

(75) Inventors: Reinhard A. Simon, St. Corona am Wechsel (AT); Helmut E. A. Knabe, Friedrichshafen (DE); Wolfgang Schäfer, Friedrichshafen (DE); Walter D. Vogel, Salem (DE); Wilhelm Wulbrand, Markdorf (DE); Wilhelm Hager, Burgrieden (DE); Kurt Lindner, Ulm (DE); Paul Hennig, Ottobrunn (DE)

(73) Assignee: LFK-Lenkflugkoerpersysteme, Unterschleissheim (DE)

( * ) Notice: Subject to any disclaimer, the term of this patent is extended or adjusted under 35 U.S.C. 154(b) by 141 days.

(21) Appl. No.: 10/830,431

(22) Filed: Apr. 23, 2004

(65) Prior Publication Data

US 2004/0258900 A1  Dec. 23, 2004

(30) Foreign Application Priority Data

Apr. 24, 2003 (DE) .................... 103 18 514

(51) Int. Cl.
*B32B 17/00* (2006.01)
*B32B 18/00* (2006.01)

(52) U.S. Cl. .................... 428/293.4; 428/325; 428/701; 428/702; 428/36.5; 428/699; 501/35; 501/53; 501/133; 422/178

(58) Field of Classification Search ................ 428/325, 428/293.4, 701–702, 36.5, 699; 501/35, 501/53, 133; 442/178
See application file for complete search history.

(56) References Cited

U.S. PATENT DOCUMENTS

| 5,188,780 A | 2/1993 | Lange et al. |
| 5,441,682 A | 8/1995 | Baker et al. |
| 5,738,750 A | 4/1998 | Purinton et al. |
| 5,856,252 A | 1/1999 | Lange et al. |
| 6,497,390 B1 | 12/2002 | Fischer et al. |

FOREIGN PATENT DOCUMENTS

| AU | B-79296/87 | 1/1991 |
| CH | 686 879 A5 | 7/1996 |
| EP | 0813508 B1 | 6/1999 |
| WO | WO 94/02429 | 2/1994 |

OTHER PUBLICATIONS

D.M. Flyate, Effect of the Zeta Potential on Paper Manufacturing Processes, 1004 Abstract Bulletin of the Inst. Of Paper Chemistry, Aug. 1998, No. 2, Appleton, US, XP 000030726.

S. Vallar et al., "Oxide Slurries Stability and Powders Dispersion: Optimization with Zeta Potential and Rheological Measurements," Journal of the European Ceramic Society, 1999, pp. 1017-1021, 19, Elsevier Science Limited, Great Britain.

K. Keller et al., "High-Temperature Insulations," ESA Bulletin, Nov. 1994, pp. 50-56, No. 80, Noordwijk, NL, XP 000481034.

*Primary Examiner*—Ling Xu
(74) *Attorney, Agent, or Firm*—Crowell & Moring LLP

(57) ABSTRACT

A two-layer ceramic composite material, wherein the first predominantly load-bearing layer is an oxidic, carbon-free fiber-reinforced ceramic layer which is made by a colloidal process. The second predominantly thermally insulating layer is an oxide-ceramic foam. The colloidal process produces carbon-free oxide ceramics which, because of their high purity, have low dielectric losses in the entire usage temperature range. In addition, the colloidal process provides a simple and cost-effective production method.

18 Claims, 3 Drawing Sheets

MULTI-LAYER CERAMIC COMPOSITE MATERIAL WITH A THERMAL-PROTECTIVE EFFECT

This application claims the priority of German Patent Document No. 103 18 514.3, filed 24 Apr. 2003 the disclosure of which is expressly incorporated by reference herein.

FIELD OF THE INVENTION

The invention relates to a multi-layer ceramic composite material with a thermal protective effect. Such composite materials are particularly suitable for thermal protection of spacecraft or missiles which heat up as a result of aerodynamic heating, the composite material taking over load-bearing, structural tasks as well as simultaneously serving as a dielectric window (radome).

BACKGROUND OF THE INVENTION

During the ascent and when entering the atmosphere of celestial bodies, that is, during re-entry into the earth atmosphere as well as during entry into the atmosphere of planets and moons, spacecraft are subjected to extreme aerodynamic, aerothermal, mechanical and acoustic stresses. During this very important flight phase, spacecraft have to be provided with an effective thermal protection which withstands the multiple mechanical, thermal and thermo-mechanical stress situations. In the case of reusable space transport vehicles, such as the U.S. Space Shuttle, the Russian Buran or the future Japanese Hope space glider, ceramic tiles or shingles are provided as a thermal protection at the hot sites, such as the underside, the nose area and the leading edges of the wings.

Future missiles will be moved in a radar-controlled manner at extreme speeds in the direction of their target, the newest developments flying at more than 6 times the speed of sound. As a result of aerodynamic heating, very high temperatures occur at the nose cone of such missiles. During the short flight, suitable thermal protection systems have to prevent heat from penetrating through the nose cone so that the functions of the radar equipment situated behind the nose cone are impaired. Simultaneously, these thermal protection systems (radomes) have to be radar-transparent at the corresponding frequencies in the gigahertz range and have to remain so in all flight conditions.

Dielectric windows (radomes or antenna covers) are used for the protection of antennas on aerodynamic vehicles (missiles) against environmental influences. Radomes have to have a high transparency and a low loss for radar waves in the entire operating frequency range. They should be able to withstand position-caused aerodynamic forces as well as have a sufficiently high resistance to temperatures occurring as a result of aerodynamic heating. Furthermore, they have to be capable of protecting the sensitive antennas accommodated in the radome against heat.

Current radomes, which are built for rockets which have to survive only a short flight (0.5 to 2 min.) at speeds of up to 4 Mach, have to be very thin in order to be able to be used at the corresponding frequencies of less than 18 gigahertz. Such radomes usually consist of a glass-fiber-reinforced polyimide. They may also consist of two thin layers of glass-fiber-reinforced polyimide which are separated by a glass polyimide honeycomb structure (sandwich construction). The disadvantage of such radomes is that the upper limit of the usage temperature of from 650 to 760° C.

Future generations of missiles will be flying significantly faster (over Mach 6) and also significantly longer. This will cast the plastic matrix of the radomes is heated considerably (peak temperatures of clearly higher than 1,000° C.) and pyrolized while forming carbon. This dramatically impairs the radar-optimal characteristics and no longer meets the required transmission characteristics. Such radomes are therefore unsuitable for future missiles.

A conventional radome in a sandwich construction is known from U.S. Patent Document U.S. Pat. No. 5,738,750, which consists of a ceramic core made of a honeycomb structure ($SiO_2$, $Al_2O_3$ or $AlSiO_4$ fibers impregnated with polysilicone and/or polysilazane) or of a foam, and consists of two cover layers made of a silica glass fabric impregnated with inorganic resin, the inorganic resin (a polysilicone and/or polysilazane) being partially converted to $SiO_2$ by way of a pyrolysis process. The material is essentially free of elementary carbon. As a result of the incomplete pyrolysis at relatively low temperatures, the formation of elementary carbon is largely prevented during the production. However, this does not mean that the material is free of carbon. It is known that a glass-like $SiO_xC_y$ phase (black glass) forms during the pyrolysis of inorganic resins, such a polysilicone and polysilazane, in which phase the carbon is embedded. Furthermore, the material described in U.S. Pat. No. 5,738,750 has an upper usage temperature limit in the oxygen-containing atmosphere of approximately 1,090° C. because, near that temperature, elementary carbon separates from the $SiO_xC_y$ phase, which leads to a clear deterioration of the dielectric characteristics.

Conventional processes for producing filament-reinforced ceramics are essentially divided into gaseous phase processes (CVI) or liquid phase processes (LMI, LPI, SIHP, Sol-Gel). CVI processes have the disadvantage that they are very cost-intensive and difficult to control. Virtually only liquid phase processes are therefore used for the production of filament-reinforced ceramics.

In the case of the LMI process (Liquid Melt Infiltration), the building-up of the matrix takes place by the infiltration of a fiber preform by means of molten metal and a simultaneous or subsequent oxidation. Here, the disadvantages are the difficult process control, the fiber corrosion as a result of the molten metal and the retention of residual metal as a result of incomplete oxidation.

In the case of the LPI process (Liquid Polymer Infiltration), the building-up of the matrix takes place by infiltrating the semifinished fiber products with suspensions which contain an inorganic polymer which, in a pyrolysis, can be preferentially converted to covalently bound, amorphous or crystalline ceramics. The conversion to ceramics is connected with large volume shrinkages and resulting crack formations within the matrix. As a remedy, passive or active fillers are used which, as a result of a volume expansion before or during the pyrolysis, partially counteract the shrinkage. A filling of the crack network and an increase of the matrix density normally takes place in multiple reinfiltration steps which represent considerable time and cost expenditures. As a result of the use of inorganic polymers (precursors), the production of oxidic fiber-reinforced ceramics can take place only to a limited extent because the C-atoms of the precursor are either bound into the diverted amorphous or crystalline structure of the ceramics, or are additionally present as elementary carbon separations. Although the C-fraction can be lowered by means of high-temperature aging under oxidative conditions, the C-fraction can be lowered, this is connected with considerable time and cost expenditures. Another possibility consists of the incomplete pyrolysis of the precursor at low temperatures with the goal of forming as little elementary carbon as possible. However, when such a material is used at high temperatures, the material has an upper time and temperature limit, as elementary carbon forms by further pyrolysis. The production of purely oxidic fiber-reinforced ceramics from inorganic polymers according to the present state of the art is always connected with C impurities. This is a significant disadvantage for a use as a radome material because even the smallest quantities of carbon impair the dielectric characteristics.

In the case of the SIHP process (Slurry Impregnation and Hot Pressing), the building-up of the matrix takes place by infiltration of semifinished fiber products with a suspension at an aqueous or organic base which contains ceramic powder, an organic binder and additional auxiliary agents. The consolidation takes place by hot-pressing or high-temperature isostatic pressing, which conventionally require considerable system-related expenditures and are limited to components having a simple geometry.

In the case of the sol-gel process, the infiltration of semifinished fiber products takes place by means of molecular-disperse or colloid-disperse sols. The transition from the low-viscosity sol to a high-viscosity sol takes place by destabilization or by hydrolysis and polycondensation reactions. By means of this technique, chemically pure oxides can be produced. However, the drying and sintering of gels is connected with very large volume shrinkages, which leads to high porosity of the matrix and to crack formation. Filling in the cracks and reducing the porosity requires multiple reinfiltrations and sintering cycles which are connected with considerable time and cost expenditures.

In the case of the EFD process (Electrophoretic Filtration Deposition), the infiltration of semifinished fiber products takes place by means of colloid-disperse sols. The transition to the gel takes place by electrophoretic deposition on an electrode, the fabric to be infiltrated being placed directly in front of the latter. Although chemically pure oxides can be produced, the high drying shrinkage frequently leads to crack formation. The production of laminates and a further densification of the matrix takes place in an additional process step by means of filter pressing, which may result in density gradients in the laminates and thus limits the production of complicated component geometries.

From U.S. Patent Document U.S. Pat. No. 5,856,252, a method is known in which the infiltration of mutually stacked fabric layers takes place by filter pressing. An aqueous suspension is used which contains a fine-particle oxide ceramic solid. The sintering takes place without pressure, whereby a purely oxidic porous matrix is created which subsequently is reinforced in several precursor reinfiltration steps and sintering cycles. However, this process requires multiple reinfiltration cycles, which result in considerable time and cost expenditures. Additionally, the process technique of filter pressing, which lead to density gradients in the laminate and limits the production of complicated component geometries.

Another process (WHIPOX) is known, in which fiber bundles are infiltrated by means of an aqueous suspension containing mullite preliminary-stage powder, a temporary binder and additional organic auxiliary agents. By means of a winding process, the fiber bundles are deposited as rotational bodies or prepregs and, in the wet state, are further processed to form laminates. After the thermal unbinding and pressureless sintering, a purely oxidic matrix is formed which has a high porosity (60 to 80%). Disadvantages of this process are caused by the winding technique and the high matrix porosity. Laminates can exclusively be built up which are constructed of unidirectionally reinforced layers. Together with the high matrix porosity, this leads to very low off-axis strengths, such as interlaminar shearing strength, intralaminar shearing strength or transversal tensile strength. Because of the winding technique, these characteristics cannot be improved by using three-dimensional reinforcing architectures. Another disadvantage is the use of a temporary binder and of organic auxiliary agents which require an additional process step for the thermal unbinding.

For the production of monolithic ceramic green bodies, essentially five shaping processes are known; specifically, pressing, isopressing, extrusion, injection molding and slip casting. These processes have no significance for the production of filament-reinforced ceramics because they do not meet the requirements with respect to a fiber-preserving complete and homogeneous infiltration of the spaces between the fibers by means of matrix, and also do not permit an economical production of large-surface, light-weight structures having a complicated geometry. Only suspensions as used during slip casting would in principle be suitable for building up the matrix. The consolidation of the slip takes place by withdrawal of the aqueous suspending agent via use of porous plaster molds. This consolidation mechanism by the withdrawal of water has the important disadvantage that a migration of fine particles and soluble constituents will occur which leads to inhomogeneous textures with density gradients. The plaster molds also have to be dried after each use, which represents additional expenditures.

The known disadvantages of slip casting are partially overcome by the process (DCC) known from Swiss Patent Document CH 686 879 A5. In this process, an aqueous suspension with a high content of solids, after decanting into a non-porous mold, is consolidated by changing the surface charge of the particles. The coagulation by changing the surface charge condition is normally achieved by substrate/enzyme reactions which shift the pH-value in the direction of the isoelectric point or increase the ion concentration. The process has the disadvantage of using enzymes which are expensive and often require special storage. They may be inhibited in their effectiveness by interactions with constituents of the slip, which makes the development of the suspension more difficult. Since the solidity of wet green bodies generally rises superproportionally with the content of solids, suspensions are used which have contents of solids between 55 and 60 percent by volume. Sufficient green strengths for removal from the mold and further handling in the wet state are achieved only by using these high contents of solids in the suspension. With respect to possible use for producing filament-reinforced ceramics, the very high solids contents of the suspensions are problematic because, as a result of the connected high viscosities, a homogeneous and complete infiltration of the space between the fibers cannot be achieved. The relatively short consolidation times in the range of between 30 minutes and 2 hours have the result that the viscosity of the suspensions rises considerably after as little as a few minutes, which is much too short as a processing period for conventional infiltrating and laminating techniques.

Another process (HAS), which also partially overcomes the known disadvantages of the slip casting, is known from European Patent Document EP 0 813 508 B1. An aqueous suspension with a high content of solids is also used in this process, to which suspension a metal nitride powder is added for the purpose of consolidation. Non-porous molds are also used. The consolidation takes place by heating the suspension above the hydrolysis temperature of the metal nitride which, when aluminum nitride is used, is at temperatures between 50° C. and 70° C. By means of the hydrolysis, the suspending agent is partially withdrawn from the suspension and, in certain cases, the pH-value is shifted, which leads to a steep increase of the viscosity. One disadvantage of the process is the necessary heating of the suspension and the connected use of heated molds. Since temperature profiles occur in the suspension, an inhomogeneous consolidation and related density gradients are expected. As in the case of the previously mentioned process, the use of very high contents of solids between 50 and 60% by volume is required in the suspension in order to be able to ensure sufficient green strengths for removal from the mold and further handling in the wet state. Because of the high contents of solids, the same problems occur with respect to possible use in the production of filament-reinforced ceramics, since the resulting high viscosities make a homogeneous and complete infiltration of the spaces between the fibers more difficult. Furthermore, the consolidation times are still shorter than in the previously mentioned process, which is much too short as a processing time period for customary infiltrating and laminating techniques.

SUMMARY OF THE INVENTION

Based on the known disadvantages of existing oxidic, filament-reinforced ceramics, an object of this invention is development of a composite material which provides the desired thermal protection, radar transparency, and thermal mechanical characteristics and can also be produced in a simple and cost-effective manner.

This and other objects and advantages are achieved by a two-layer ceramic composite material according to the invention. The first, predominantly load-bearing layer consists of oxidic, carbon-free fiber-reinforced ceramics, and is produced by a colloidal process. The second, predominantly thermally insulating layer is an oxide ceramic foam.

In an embodiment, the invention comprises a multi-layer ceramic composite material having a thermal protective effect, comprising:

an oxidic carbon-free fiber-reinforced ceramic layer, comprising at least 30% by volume of high-strength oxide-ceramic full fibers, and an oxidic carbon-free matrix having characteristics at room temperature of a tensile strength >140 MPa, a heat conductivity <2 W/mK, a real part of a dielectric constant $\epsilon'<6$, and a loss factor $\tan \delta <0.002$; and a thermal insulation layer comprising an oxidic foam having a density between about 0.2 and about 1.4 g/cm$^3$, a heat conductivity <0.25 W/mK, a real part of a dielectric constant $\epsilon'$ between 1.5 and 2.5, and a loss factor $\tan \delta <0.01$, wherein a process for forming said oxidic carbon-free matrix comprises:

consolidating an aqueous colloidal suspension having a solids fraction from 40% by volume to 50% by volume, wherein said consolidation of the fibers and matrix takes place in a closed, non-porous mold at room temperature at a pressure from about 0.1 bar to about 1 bar, and wherein the zeta potential of solids in the suspension is reduced to a value of between +5 mV and −5 mV;

drying the composite of the matrix and the fibers in a free-standing manner at a temperature between about 20 C and 95 C after removing said composite from the mold; and sintering the composite of the matrix and the fibers to a desired density in a free-standing manner in air.

The colloidal process used for the production of the first layer results in carbon-free oxide ceramics which, because of the high purity, are distinguished by low dielectric losses as well as by high thermo-mechanical endurance in the entire usage temperature range. In addition, the colloidal process provides a simple and cost-effective production method.

The composite material according to the invention contains no glassy $SiO_xC_y$ phase and, as a result of the production method, is free of carbon. It is therefore suitable for thermal protection and as a radome of future high-speed missiles or spacecraft.

The composite material according to the invention can be produced by technically comparatively simple processes which are cost-effective in their implementation. Improvements are achieved in that aqueous suspensions of low viscosity are used for the matrix build-up of the first fiber-reinforced layer. These suspensions are ecologically acceptable and ensure a homogeneous and complete infiltration of the spaces between the fibers. The construction of laminates can take place by conventional manual laminating techniques, which have been known for a long time from the plastics industry for the production of fiber-reinforced plastics. For this purpose, non-porous metal or plastic molds as well as the vacuum bag technique for degassing and consolidation can be used. This allows for the cost-effective production of large-surface light-weight structures of a complicated geometry while the piece numbers are low, as is typical for components made of fiber-reinforced ceramics. If higher piece numbers are required, conventional automated laminating techniques may also be used. Alternatively, an infiltration of three-dimensional reinforcing architectures may be performed. Sufficiently long processing time periods (approximately 6 to 8 hours) are available for the infiltration and the laminating at room temperature. The consolidation of the composite of the matrix and the fiber takes place without organic or polymeric auxiliary agents and without the withdrawal of water at room temperature within 24 hours. The consolidation occurs via an in-situ reaction which results in reduction of the repelling particle interaction forces and forming of a low-defect texture without density gradients. Since the matrix build-up takes place without the use of inorganic polymers or precursors as well as without the use of temporary organic binders, no unbinding is required. Additionally, a matrix with a high chemical purity is formed without any carbon impurities. The subsequent drying and sintering can take place in a free-standing manner in air. Furthermore, subsequent reinfiltration cycles are not required.

The second layer of the composite material according to the invention consists of an oxide ceramic foam. This preferably is a highly porous foam which advantageously has a volume percent of pores which is larger than 45%. These may be open or closed pores. Such foams can be produced from fine-grained powders mixed with foaming agents. A connection to the first fiber-reinforced layer can be established by way of a high-temperature-stable oxidic ceramic bonding agent. However, in certain cases, the two layers may also be coupled mechanically.

Depending on the frequency and mechanical stress, the thickness of the first layer is either small in comparison to the wavelength or within the range of half the wavelength. The thickness of the second layer is at least as great so that the thermal protection effect is sufficient and is otherwise adapted to the electric demands on the transmission of the complete layer system.

BRIEF DESCRIPTION OF THE DRAWINGS

In the following, the invention will be explained in detail by means of embodiments with reference to drawings.

DETAILED DESCRIPTION OF THE PREFERRED EMBODIMENT

Figure 1:
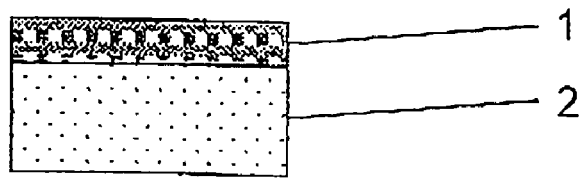
FIGS. 1 to 4 are views of different embodiments of the multi-layer composite material according to the invention.

FIG. 1 illustrates the basic construction of the multi-layer composite material according to an embodiment of the invention. It comprises a first layer 1 made of oxidic carbon-free fiber-reinforced ceramics and a thermal insulation layer made of a purely oxide-ceramic foam as a second layer 2. The first layer 1 is predominantly used as a load-bearing layer and has a high mechanical stability. The second layer 2 is used as a thermal insulation layer.

Fiber bundles, rovings, two-dimensional, two-and-a-half-dimensional or three-dimensional textile semifinished fiber products, such as layings, woven fabrics, interweavings, knitted fabrics or the like, can be used as the reinforcing component for the first layer, which are constructed of high-strength oxide-ceramic full fibers. Preferably, the fibers are composed of mullite, aluminum oxide, yttric oxide or a mixture thereof.

The thermal insulation layer 2 preferably comprises of a highly porous, crystalline $SiO_2$, highly porous $Al_2O_3$, or a mixture thereof, the volume percent of pores being greater than 45%.

Figure 2:
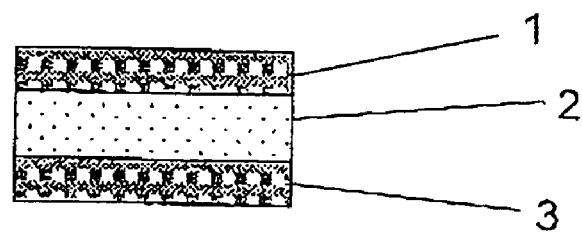

In the embodiment according to FIG. 2, another layer 3 is applied to the second layer 2 for increasing the stiffness and/or for achieving desired electromagnetic properties. Layer 3, with respect to its construction, essentially corresponds to the construction of the first layer. A sandwich is created with the second layer 2 being the center layer. As a function of the frequency and mechanical stress, the thicknesses of the first layer 1 and the additional layer 3 can be small in comparison to the wavelength or within the range of half the wavelength.

Figure 3:
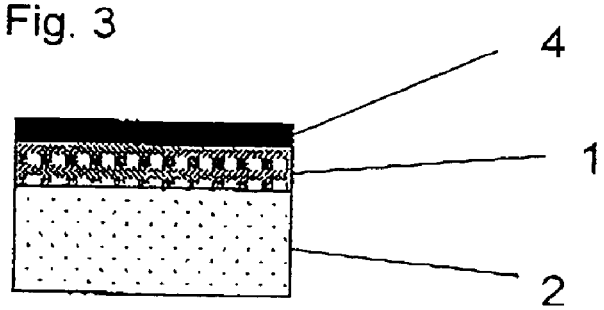
Figure 4:
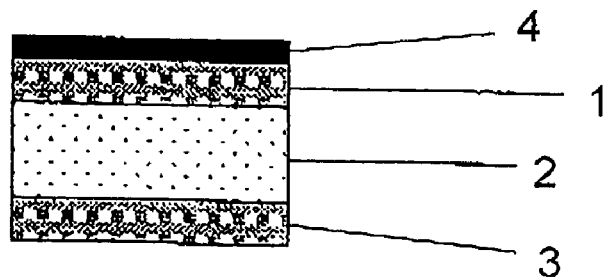

According to the embodiments shown in FIGS. 3 and 4, an ablation layer 4 is applied to the first layer 1. During use as a radome or as thermal protection for aircraft and spacecraft, this ablation layer forms the side of the composite body which faces toward the outside. The ablation layer 4 can be composed of a non-carbonizing ablating polymer, such as polytetrafluor ethylene (PTFE) or perfluoralkoxy (PFA) fluorocarbon. In another embodiment, the ablation layer 4 comprises of a PTFE and/or PFA matrix with an electrically non-conductive reinforcing material, such as short-cut fibers and/or flakes made of glass or ceramics.

Figure 5:
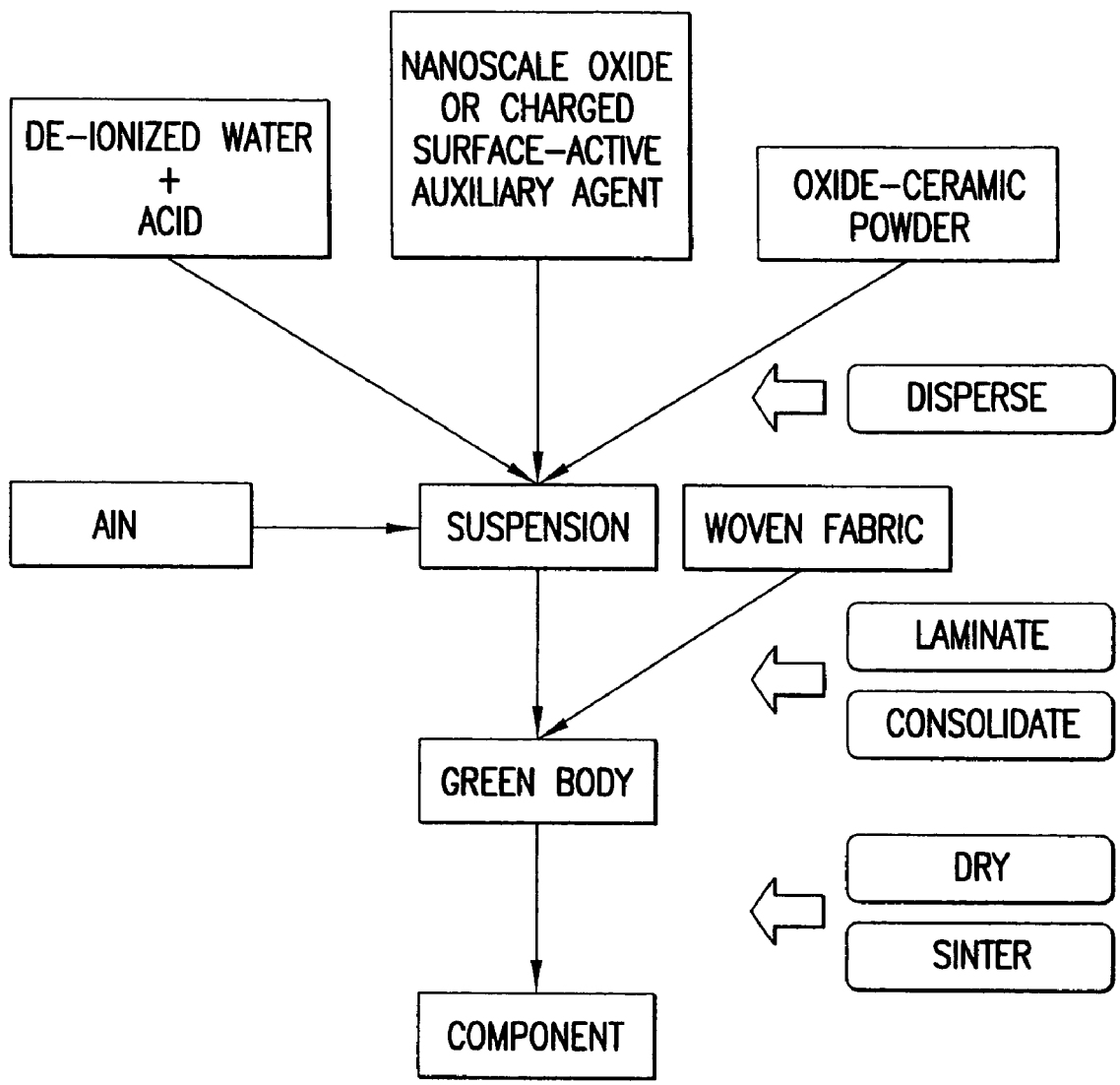
FIG. 5 is a process diagram for producing the first fiber-reinforced layer according to an embodiment of the invention.
Figure 6:
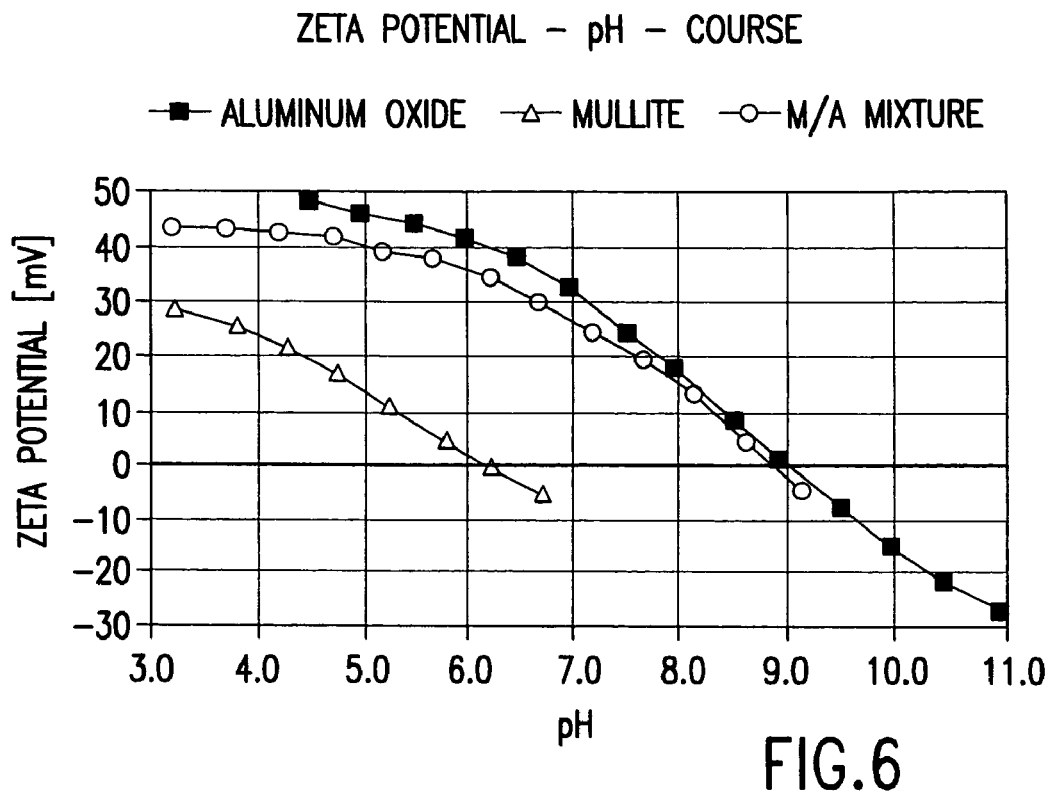
FIG. 6 is a diagram concerning the influence of the pH-value on the zeta potential when adding a nanoscale aluminum oxide to the main mullite constituent when producing the first fiber-reinforced layer according to an embodiment of the invention.

In an embodiment, the production of the first, fiber-reinforced layer of the composite material according to the invention preferably takes place according to the following process steps (FIG. 5):

1. In the first step a colloidal aqueous suspension is produced which contains the solid in the form of a fine-particle oxide-ceramic powder or a powder mixture desired for the matrix build-up. The composition of the powder or powder mixture depends on the intended use of the composite material. Here, various materials can be used, such as mullite ($3Al_2O_3 \cdot 2SiO_2$), aluminum oxide, silica, yttric oxide or mixtures thereof. In this embodiment, mullite is preferred as a main constituent. The mean particle size of the disperse powder is preferably between 200 nm and 1 µm. The fraction of solids in the suspension which, preferably, depends on the viscosity permissible for a complete and homogeneous infiltration of the spaces between fibers, is between 40 and <50% by volume. In order to shift the isoelectric point of the used powder or powder mixture, if required, into the range of pH 9.0 to 9.5, a nanoscale oxide powder (mean particle size preferably smaller than 200 nm) is advantageously added to the suspension, whose isoelectric point is in the above-mentioned range. Aluminum oxide powder or aluminum hydroxide powder, for example, are suitable powders whose mean particle size below 200 nm. The added amount of nanoscale oxide powder may vary according to the used powder mixture, with preferred amounts being between 5 to 20% by weight of the powder mixture. For adjusting the viscosity to as low a value as possible, an acid. Preferably, $HNO_3$ or HCl, is added in order to shift the pH-value into the acidic range of below pH 5. In this case, a positive surface charge is generated on the particle surface of the nanoscale oxide particles, resulting in an electrostatic stabilization which can be measured in the form of a high positive zeta potential. Although the nanoscale oxide powder does not represent the main constituent of the powder mixture, electrochemically, the mixture virtually acts like the nanoscale oxide powder alone. FIG. 6 shows this for the case of a nanoscale aluminum oxide powder. Should the addition of a nanoscale oxide not take place, the isoelectric point can alternatively be adjusted into the range of from pH 9.0 to 9.5, by the addition of charged surface-active auxiliary agents in the form of a cationic or anionic substance. Polyelectrolytes or surface-active agents, for example, are suitable for this purpose, which are added in a quantity of below 1% by weight relative to the solids.

Figure 7:
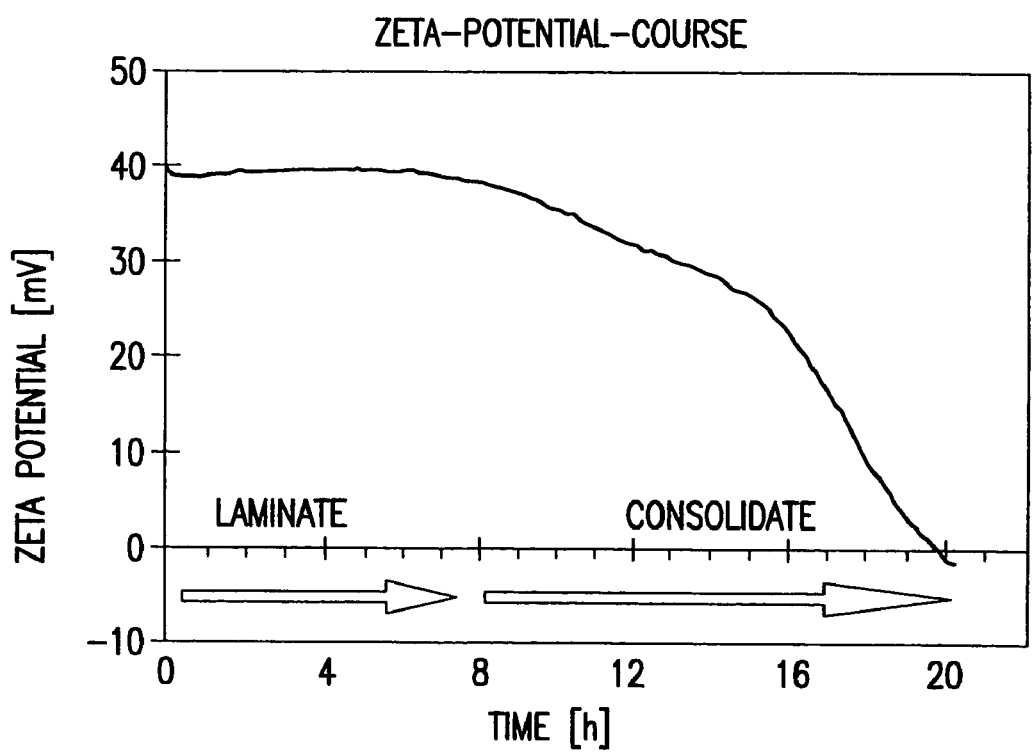
FIG. 7 is a diagram concerning the change of the zeta potential with the time after the addition of an aluminum nitride powder when producing the first fiber-reinforced layer.

2. Immediately before the production of the fiber-reinforced ceramic component, an aluminum nitride powder of a quantity of less then 2% by weight can be added to the suspension for the purpose of consolidation and can be homogeneously distributed by means of an ultrasonic treatment. Subsequently, the production of the laminate takes place at room temperature, for example, by infiltrating individual woven fabric layers, which are layered in a conventional "wet-in-wet" manual laminating process. The layers are degassed by a vacuum bag technique and are consolidated at pressures of between 0.1 and 1 bar in a non-porous closed mold. After the addition of aluminum nitride, typically 6 to 8 hours are available for the infiltrating and laminating, during which the zeta potential and, connected therewith, also the viscosity remain virtually unchanged. As illustrated in FIG. 7, the consolidation typically takes place within 24 hours at room temperature; that is, below the hydrolysis temperature of the aluminum nitride, which is normally between 50° and 70° C. During the consolidation, the pH-value is shifted to the isoelectric point between pH 9.0 and pH 9.5, whereby the zeta potential is virtually completely reduced; all repelling particle interaction forces are reduced or eliminated; and primarily only attracting van-der-Waals forces are still effective between the particles. As a result, high green strengths are achieved in the still undried state even when low-viscosity suspensions are used which have only moderate fractions of solids.

3. After the consolidation, the wet green part is removed from the mold and is subsequently dried in a free-standing manner at temperatures of between 20° and 95° C.

4. The dried green part is sintered in a free-standing manner in air, the sintering temperature depending on the respective matrix composition and the desired characteristics of the composite material.

Concrete embodiments for producing the first load-bearing layer will be described in the following.

EXAMPLE 1

An acidic suspension was produced in that a corresponding quantity of mullite powder and aluminum oxide powder was dispersed in de-ionized water. With the pH-value of the suspension adjusted to a value lower than pH 5 by the addition of a 5 molar $HNO_3$ solution. The suspension was deagglomerated by means of ultrasound. A little aluminum nitride powder was added to the suspension and homogeneously dispersed by means of an ultrasonic treatment. Subsequently, the low-viscosity suspension was degassed by means of a rotary evaporator in order to remove possibly trapped air. Eight oxidic woven-fabric layers with the desired dimensions were infiltrated with a suspension by means of the wet-in-wet manual laminating technique and were placed in layers to form a laminate. The laminate was airtightly closed off in a vacuum bag between metal molds and was degassed for an hour. Subsequently, during the consolidation in the closed mold, the laminate was pressed together at a pressure of between 0.1 and 1 bar. The removal of the wet laminate from the mold took place after 24 hours. The removed laminate had a sufficiently high green strength and could subsequently be dried in a free-standing manner and be sintered in air. The produced filament-reinforced ceramics are characterized by a high damage tolerance and very low dielectric losses.

EXAMPLE 2

For producing an aqueous sample, a cationic polyelectrolyte was dissolved in a corresponding quantity of de-ionized water. An acidic suspension was produced in that mullite, aluminum hydroxide and silica powder were dispersed in the aqueous sample, with the pH-value of the suspension adjusted to a value lower than pH 5 by the addition of a 5 molar $HNO_3$ solution. The suspension was deagglomerated by means of a ball-type mill. A little aluminum nitride powder was added to the suspension and homogeneously dispersed by means of an ultrasonic treatment. Subsequently, the low-viscosity suspension was degassed by means of a rotary evaporator in order to remove possibly trapped air. Eight oxidic woven-fabric layers with the desired dimensions were infiltrated with a suspension by means of the wet-in-wet manual laminating technique and were placed in layers to form a laminate. The laminate was airtightly closed off in a vacuum bag between metal molds and was degassed for an hour. Subsequently, during the consolidation in the closed mold, the laminate was pressed together at a pressure of from 0.1 to 1 bar. The removal of the wet laminate from the mold took place after 24 hours. The removed laminate had a sufficiently high green strength and could subsequently be dried in a free-standing manner and be sintered in air. The produced filament-reinforced ceramics are characterized by a high damage tolerance and very low dielectric losses.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-layer ceramic composite material having a thermal protective effect, comprising:

an oxidic carbon-free fiber-reinforced ceramic layer, comprising at least 30% by volume of high-strength oxide-ceramic full fibers, and an oxidic carbon-free matrix having characteristics at room temperature of a tensile strength >140 MPa, a heat conductivity <2 W/mK, a real part of a dielectric constant $\epsilon'<6$, and a loss factor tan $\delta<0.002$; and a thermal insulation layer comprising an oxidic foam having a density between about 0.2 and about 1.4 $g/cm^3$, a heat conductivity <0.25 W/mK, a real part of a dielectric constant $\epsilon'$ between 1.5 and 2.5, and a loss factor tan $\delta<0.01$, wherein a process for forming said oxidic carbon-free matrix comprises:

consolidating an aqueous colloidal suspension having a solids fraction from 40% by volume to 50% by volume, wherein said consolidation of the fibers and matrix takes place in a closed, non-porous mold at room temperature at a pressure from about 0.1 bar to about 1 bar, and wherein the zeta potential of solids in the suspension is reduced to a value of between +5 mV and −5 mV;

drying the composite of the matrix and the fibers in a free-standing manner at a temperature between about 20 C and 95 C after removing said composite from the mold; and sintering the composite of the matrix and the fibers to a desired density in a free-standing manner in air.

2. A ceramic composite material according to claim 1, wherein the solids of the suspension for producing the oxidic carbon-free fiber-reinforced ceramic layer comprise an oxide-ceramic powder, preferably mullite, aluminum oxide, silica, yttric oxide or a mixture thereof, having a mean particle size in a dispersion of smaller than 1 μm.

3. A ceramic composite material according to claim 2, wherein the oxide-ceramic powder is selected from the group consisting of mullite, aluminum oxide, silica, yttric oxide, and mixtures thereof.

4. A ceramic composite material according to claim 1, wherein the suspension for producing the oxidic carbon-free fiber-reinforced ceramic layer comprises a nanoscale oxide-ceramic powder, wherein said nanoscale oxide-ceramic powder produces an increase in zeta potential of the suspension at pH<7 and adjusts the isoelectric point of the suspension to between about pH 9.0 and pH 9.5.

5. A ceramic composite material according to claim 1, wherein the suspension for producing the oxidic carbon-free fiber-reinforced ceramic layer comprises a charged surface-active auxiliary agent, wherein said charged surface-active auxiliary agent produces an increase in zeta potential of the suspension at pH<7 and adjusts the isoelectric point of the suspension to between about pH 9.0 and pH 9.5.

6. A ceramic composite material according to claim 1, wherein said suspension for producing the oxidic carbon-free fiber-reinforced ceramic layer comprises a metal nitride powder, wherein said metal nitride powder reduces the zeta potential of the suspension.

7. A ceramic composite material according to claim 1, wherein said high-strength oxide-ceramic full fibers are present in the form of fiber bundles, rovings, two-dimensional, two-and-a-half-dimensional or three-dimensional textile semifinished fiber products, layings, woven fabrics, interweavings, or knitted fabrics.

8. A ceramic composite material according to claim 7, wherein said high-strength oxide-ceramic full fibers are composed of mullite, aluminum oxide, yttric oxide, or a mixture thereof.

9. A ceramic composite material according to claim 1, wherein said oxidic foam comprises highly porous, crystalline $SiO_2$, highly porous $Al_2O_3$, or a mixture thereof, wherein a volume percent of pores is greater than 45%.

10. A ceramic composite material according to claim 1, wherein a third layer is applied to said thermal insulation layer, said third layer corresponding in construction to the first layer, wherein a sandwich is created with said thermal insulation layer as a center layer.

11. A ceramic composite material according to claim 1, further comprising an ablation layer comprising a non-carbonizing ablating polymer applied as an exterior layer to said oxidic carbon-free fiber-reinforced ceramic layer.

12. A ceramic composite material according to claim 11, wherein said ablation layer comprises polytetrafluoroethylene or perfluoralkoxy fluorocarbon.

13. A ceramic composite material according to claim 11, wherein said ablation layer comprises a matrix composed of polytetrafluoroethylene, perfluoralkoxy fluorocarbon, or a mixture thereof and an electrically non-conductive reinforcing material.

14. A ceramic composite material according to claim 13, wherein the electrically non-conductive reinforcing material comprises short-cut fibers or flakes made of glass or ceramics.

15. A ceramic composite material according to claim 1, wherein said composite material is constructed as a radome in the shape of an ogive or of a pointed cone.

16. A ceramic composite material according to claim 1, wherein said ceramic composite material is thermally stable in the temperature range of room temperature to 1,500° C.

17. A heat-resistant electromagnetic window, comprising a ceramic composite material according to claim 1.

18. A multi-layer ceramic composite material having a thermal protective effect, comprising:

an oxidic carbon-free fiber-reinforced ceramic layer, comprising at least 30% by volume of high-strength oxide-ceramic full fibers, and an oxidic carbon-free matrix having characteristics at room temperature of a tensile strength >140 MPa, a heat conductivity <2 W/mK, a real part of a dielectric constant $\epsilon'<6$, and a loss factor $\tan \delta < 0.002$; and a thermal insulation layer comprising an oxidic foam having a density between about 0.2 and about 1.4 g/cm$^3$, a heat conductivity <0.25 W/mK, a real part of a dielectric constant $\epsilon'$ between 1.5 and 2.5, and a loss factor $\tan \delta < 0.01$.

* * * * *